United States Patent
Saul

(10) Patent No.: US 8,122,738 B2
(45) Date of Patent: Feb. 28, 2012

(54) METHOD AND APPARATUS FOR CREATING AN AIR-CONDITIONED ATMOSPHERE

(75) Inventor: Heinrich Saul, Hamburg (DE)

(73) Assignee: Hoffmann Consorten Hamburg GmbH (DE)

( * ) Notice: Subject to any disclaimer, the term of this patent is extended or adjusted under 35 U.S.C. 154(b) by 588 days.

(21) Appl. No.: 11/992,360

(22) PCT Filed: Sep. 22, 2006

(86) PCT No.: PCT/EP2006/009246
§ 371 (c)(1),
(2), (4) Date: Apr. 15, 2009

(87) PCT Pub. No.: WO2007/033835
PCT Pub. Date: Mar. 29, 2007

(65) Prior Publication Data
US 2009/0211298 A1 Aug. 27, 2009

(30) Foreign Application Priority Data
Sep. 23, 2005 (DE) .......................... 10 2005 045 760

(51) Int. Cl.
*F25J 3/00* (2006.01)
(52) U.S. Cl. .................................. 62/640; 62/92; 62/274
(58) Field of Classification Search .............. 62/92, 274, 62/281, 407, 640
See application file for complete search history.

(56) References Cited

U.S. PATENT DOCUMENTS
5,457,963 A * 10/1995 Cahill-O'Brien et al. ........ 62/78
6,418,752 B2 * 7/2002 Kotliar ............................ 62/640

FOREIGN PATENT DOCUMENTS
| DE | 101 43 527 A1 | 3/2003 |
| DE | 102 16 518 A1 | 10/2003 |
| EP | 0 224 469 A2 | 6/1987 |
| EP | 0 357 949 B1 | 3/1990 |
| EP | 0 888 804 A2 | 1/1999 |
| WO | 03/086874 A2 | 10/2003 |
| WO | 2004/043473 A1 | 5/2004 |

OTHER PUBLICATIONS

International Search Report issued on Jan. 10, 2007 in connection with corresponding International Application No. PCT/EP2006/009246.

* cited by examiner

*Primary Examiner* — Melvin Jones
(74) *Attorney, Agent, or Firm* — Lerner, David, Littenberg, Krumholz & Mentlik, LLP

(57) ABSTRACT

The invention relates to an apparatus for creating an air-conditioned atmosphere in a transportation container (14), having a compressor (3) for generating compressed air, a cooling device (5) for cooling the compressed air and a gas-separation diaphragm (10), which is connected downstream of the compressor (3) and the cooling device (5), for producing a nitrogen-rich gas stream, and a wetting diaphragm (12), with the apparatus permitting controlled wetting of the nitrogen-rich gas stream. The invention also relates to a method for creating an air-conditioned atmosphere in a storage or transportation container, in which method compressed air is generated by means of a compressor, the compressed air is then cooled using a cooling device and a nitrogen-rich gas stream is produced from the compressed air for the purpose of conduction into the transportation container by means of a gas-separation diaphragm.

22 Claims, 7 Drawing Sheets

METHOD AND APPARATUS FOR CREATING AN AIR-CONDITIONED ATMOSPHERE

The subject of the invention is a device for producing an air conditioned atmosphere in a storage or transport container with a compressor to produce compressed air, a cooling device to cool down the compressed air, a gas separation membrane connected downstream from the compressor and the cooling device to produce a gas flow rich in nitrogen. Furthermore, the invention deals with a method for producing an air conditioned atmosphere in a storage or transport container, wherein compressed air is produced by means of a compressor, the compressed air is then cooled with a cooling device, and a nitrogen-rich gas flow is produced from the compressed air for conveyance into the transport container by means of a gas separation membrane.

Perishable goods can only last for a limited time under their usual ambient conditions. Depending on the type of goods, the storage and thus the transport times are sometimes only a few days. Preservation of quality during a lengthy storage or transport time can be improved by changing the ambient atmosphere. It is known that a reduced-oxygen atmosphere has quality-preserving effects in the storage or transport container.

Of special importance is the use of an air conditioned atmosphere (Controlled Atmosphere (CA)) during the storage and transport of fruit and vegetables (perishables). The natural storage times of goods like fruit vegetables and flowers are very short, sometimes only a few days. In view of the worldwide transport of these goods, there is considerable interest on the part of transportation logistics in methods and devices to achieve long-term storage and transport.

The basic requirement for storage and transport of fruit and vegetables is cooling. By additional extreme reduction of the oxygen content in the atmosphere of the transport or storage container, the goods being transported fall into a kind of "artificial coma". The vital processes of the fruit are reduced to a minimum, and energy conversion decreases. Under such conditions. even fully ripened fruit can be stored or transported for weeks.

In recent years, corresponding storage or transport containers with cooling systems have been built and operated, in which an air conditioned atmosphere prevails on the basis of membrane technology, In order to product nitrogen, compressed air is produced from the surrounding air (ca. 89% nitrogen and 21% oxygen) and passed through a gas separation membrane, which depending on the pressure setting at the outlet of the membrane produces a nitrogen flow with 1-5% residual oxygen (residue). Depending on its purity, the nitrogen flow has a proportion of 20-30% of the compressed air used. The membrane separates the water vapor present in the compressed air, in addition to other gases contained in the compressed air (such as noble gases).

A corresponding device for producing a nitrogen-containing atmosphere in a transport container is known from EP 0 357 949 B1, wherein nitrogen is obtained from the surroundings by means of a nitrogen generator, consisting of an air compressor and a gas separating membrane. This device is described as a removable unit for transport containers, to be mounted if need be, which can also contain a cooling assembly if needed. The drawback of the described system is that a controlled setting of the humidity in the atmosphere of the container is not possible. Neither is it possible to influence the quality of the nitrogen in terms of the content of residual oxygen during the operation of the unit.

The transported fruit gives off moisture during the transport. This moisture loss becomes greater as the humidity decreases in the container atmosphere and leads to a measurable weight loss. This weight loss not only represents a decrease in the merchantable mass and, thus, a lost profit, but also the fruit loses its fresh appearance, which likewise makes it harder to sell. The usual weight loss of fruit during container transport, for example, from Brazil to Europe in an air conditioned atmosphere, is 2 to 3 wt. % of the original weight.

DE 101 43 527 C2 therefore proposes a device by which nitrogen is obtained from the surrounding air by means of an air compressor and a gas separation membrane. At the same time, the device contains a humidity regulating mechanism, in order to raise the moisture content of the container's atmosphere. The drawback with this humidity regulating mechanism is that an adapted delivery of moisture is not possible, but instead the described moistening works by the on and off method. Furthermore, neither does this system enable a specific control of the residual oxygen content in the nitrogen-rich compressed air.

The problem of the present invention is to provide a method and a device which overcomes the known drawbacks of the prior art and in particular is suited to creating and maintaining an air conditioned atmosphere with an elevated nitrogen content from the surrounding air at the most different ambient temperatures for a given moisture content in a storage or transport container. The water required for moistening the container's atmosphere should be obtained exclusively from the container's atmosphere, as well as the surrounding atmosphere, so that the device does not require any separate water reservoir for the moistening.

The problem is solved according to the invention by a device for producing an air conditioned atmosphere in a transport container with a compressor for creation of compressed air, a cooling device for cooling down the compressed air, a gas separation membrane connected downstream from the compressor and the cooling device to produce a gas flow rich in nitrogen, wherein the gas flow emerging from the gas separation membrane is taken to the transport container in order to maintain a nitrogen-rich, air conditioned atmosphere in the container, characterized in that the device has a moistening membrane, which is arranged behind the gas separation membrane, and the nitrogen flow emerging from the gas separation membrane is led through the moistening membrane and laden with moisture in the moistening membrane.

The problem is furthermore solved by a method for producing an air conditioned atmosphere in a storage or transport container, wherein compressed air is produced by means of a compressor, optionally from the surrounding air or the container's air, the compressed air is then cooled with a cooling device and a nitrogen-rich gas flow is produced preferably from the compressed air for conduction to the transport container by means of a gas separation membrane. wherein the nitrogen flow is especially preferably moistened before being introduced into the transport container. characterized in that the overflowing container atmosphere is led in a circuit and after emerging from the transport container it is again taken to the air compressor.

Additional embodiments are the subject of the subclaims or described below.

In the device of the invention, a nitrogen flow is generated by an air compressor, connected to a gas separation membrane downstream. The nitrogen flow is taken across a moistening membrane, connected to the gas separation membrane downstream, to a storage or transport container. The moistening membrane can have humidified compressed air flowing through it, in order to transfer the humidity to the nitrogen flow, or alternatively no compressed air will flow through it, so that no moisture is provided for transfer to the nitrogen flow. In this way, one can deliberately adjust a specific moisture content for the atmosphere of the container.

By nitrogen flow in the sense of the invention is meant the nitrogen-rich flow of compressed air emerging from the gas separation membrane. Compressed air refers to the air compressed in the compressor, regardless of whether it involves compressed surrounding air, compressed container atmosphere, or a mixture of the two. The gas mixture present in the container is called container atmosphere and the gas emerging from the container is called displaced container atmosphere. By moisture or humidity is meant the water content of the particular gas mixture, i.e., the proportion of water vapor.

When compressed air is produced, heat builds up in the compressor. This heat is taken up by the compressor oil, taken through an oil cooler and cooled there. The cooling in the oil cooler normally occurs by a current of air, produced by a blower. In one advantageous embodiment, the compressor oil is taken across a heat exchanger, rather than an oil cooler, through which the refrigerant of the existing cooling system flows in the opposite direction. Since the design size of such a heat exchanger is exceptionally small, it can be advantageously integrated into the overall system. No extra device, such as a blower to produce the cooling, is required when the heat exchanger is used, In another embodiment, instead of the customary oil/air cooler, one uses an oil/refrigerant heat exchanger as the oil cooler. This oil/refrigerant cooler also has the advantage of being very small and thus it can easily be integrated in the device. In this way, mechanical damage or corrosive attack from marine air can be minimized. The oil/refrigerant cooler is preferably configured as a plate type heat exchanger, with the input side of the plate heat exchanger being connected directly to the oil outlet and oil inlet fittings of the compressor. The plates of the heat exchanger form, along with the narrow spaces for oil and refrigerant, a cumulative large surface for the heat transfer from the compressor oil to the refrigerant. The heat transfer occurs directly from fluid to fluid across the metal surfaces.

Preferably, the compressed air is cooled down in a cooling device before being conveyed to the gas membrane. The lowering of the temperature of the compressed air occurs, according to the invention, via the heat exchange with the flow of cool air of the cooling device. This arrangement is exceptionally effective, sine the inner temperature of the warehouse or transport container generally lies below the ambient temperature and therefore the temperature of the cooled, compressed air can be cooled down to a value below the ambient temperature, The cooling device of the invention requires no additional mechanisms to create a further cooling.

When using the embodiment with a heat exchanger, the lowering of the temperature of the compressed air occurs in two stages: in the first stage, the uncooled compressed air emerging from the compressor is cooled down by means of a double-tube heat exchanger by cooled compressed air prior to entering the gas membrane. In this process, the compressed air entering the gas separation membrane is heated and takes on a relative humidity of around 80-85%. In the second stage, the compressed air is cooled by means of a cooling pipe by heat exchange with the current of cool air of the cooling device. The use of a heat exchanger also enables an effective cooling without the use of additional mechanisms.

The device of the invention allows for a simplified arrangement and a reduction in the number of components needed for its operation. This reduction has a positive impact on the stability of the layout and, thus, the safety of the transport.

The device of the invention is preferably a separate unit, which is mounted in direct proximity to the refrigeration system or a storage or transport container. The device of the invention can be used both for stationary units, such as cold storage houses, and also for refrigerated ships, reefer containers, refrigerated trucks or rail vehicles, For reefer containers, it is advantageous to integrate the components of the unit in the free spaces of the refrigerated system, in order to form a compact unit, allowing for the space requirements in present-day navigation.

The method of the invention goes through various operating phases. These can occur in sequence, one after the other. However, it is also possible to run the method in only one operating phase.

At the start of the method of the invention (starting phase type I), the container atmosphere in the storage or transport container can be lowered in its temperature by cooling. The relative humidity will rise in this way, so that at this time no moistening of the nitrogen flow is needed to maintain the moisture content of the container atmosphere. Ambient air is sucked in from the surroundings through an intake device and compressed by an air compressor. The temperature of the air sucked in is raised by the heat of compression.

The compressed air produced is taken in part from the air compressor through a cooling device, where it is cooled to a temperature just above the temperature inside the storage or transport container and taken to a mixing point. Another partial current of the compressed air is taken directly to a mixing point, where both partial currents enter into a mixing and form a mixed temperature. In this way, any desired temperature between the interior temperature of the storage or transport container and the highest possible operating temperature of the downstream units can be formed.

From the mixing point the compressed air is taken for treatment at a water separator and an air filter. Any free water present, such as from the reduced temperature of the compressed air in the cooling device and the resulting lower carrying capacity of the compressed air, is removed in the water separator. Any aerosols which may be present in the compressed air are filtered out by the air filter. Upon leaving the water separator, the compressed air optimally has a relative humidity of at most 100%, i.e., no more free water particles are present.

The compressed air free from water of condensation after the water separator may lose temperature after leaving the separator and thus again liberates water particles, When a heat exchanger is used, the temperature of the compressed air is again raised by the first stage of the cooling device before entering the gas membrane, so that the air has a humidity of less than 100%. For further separation of free water which has formed in the meantime, a water trap is preferably arranged upstream from the gas separation membrane. The water trap makes it possible to remove additional free water particles. so as to further dry the compressed air taken to the gas separation membrane. In the starting phase, the compressed air is taken entirely to a gas separation membrane. With the gas separation in the gas separation membrane into nitrogen and oxygen and the predominant separation of the oxygen into the surroundings, the water vapor still contained in the compressed air is also separated and given up to the surroundings. The nitrogen produced is taken from the gas separation membrane to a nitrogen control valve, e.g., a cascade valve, Depending on the actuation, more or less of a nitrogen flow is created with a corresponding fraction of residual oxygen. The nitrogen flow is than taken to the storage or transport container.

After lowering the storage or transport temperature inside the container and the buildup of nitrogen, it becomes necessary to add moisture to the container atmosphere in order to maintain the desired humidity in the container. The startup phase is then concluded and the process can be managed in stationary duty. If not enough moisture is added, the fruit inside the container will give off more water in order to create its "preferred" humidity in the surrounding atmosphere.

The methods known from the prior art work by expelling the atmosphere into the surroundings. As a rule, the expelled atmosphere has a relative humidity of 85-95%. Thus, moisture is constantly given off to the surroundings. This moisture is lost to the process.

Contrary to this, in the method of the invention, no moisture is lost. In stationary duty, therefore, the displaced atmosphere from the storage or transport container including the water condensed out by the cooling device is taken preferably to the air compressor. To make up for the air carried away as permeate from the gas separation membrane, air is sucked in from the surroundings and compressed. Depending on the moisture content of the expelled atmosphere and the surrounding air sucked in, the compressed air contains water, which is bound as water vapor or entrained by the compressed air as condensate (free water), depending on the temperature of the compressed air.

In the method of the invention, only a partial flow of the compressed air is taken directly to the gas separation membrane in the stationary duty, while another partial flow is taken across a moistening membrane. In the moistening membrane, the compressed air is dehumidified and the water vapor is transferred to the nitrogen flow coming from the gas separation membrane. The dehumidified compressed air is released to the surroundings after the moistening membrane.

In the starting phase, no compressed air flows through the moistening membrane, so that the dry nitrogen is not moistened. In the stationary duty, compressed air flows through the moistening membrane as described, so that moisture is transferred to the dry nitrogen. By comparing the water content of the container atmosphere with the water content of the nitrogen flow, the temperature of the compressed air is adjusted so that the water content of the compressed air corresponds to the required transfer efficiency to the nitrogen. In this way, the quantity of water supplied with the nitrogen can be attuned to the quantity of water carried away by displacement of the container atmosphere. The absorbency of the depressurized nitrogen, to which the moisture is transferred, is always greater than the absorbency of the compressed air. With rising temperature of the compressed air, the absorbency increases and, for example, at 20° C., it amounts to 17.15 g/m$^3$, at 40° C. to 50.67 g/m$^3$ and at 60° C. to 129.02 g/m$^3$.

The nitrogen introduced into the storage or transport container raises the internal pressure of the container until a pressure maintaining device responds. After the pressure maintaining device responds, displaced container atmosphere flows into the intake device and from there it goes to the compressor again. The increased air pressure in the container as compared to the surroundings prevents the entry of oxygen from the surrounding atmosphere. In this way, even when the air compressor is shut off, the nitrogen level once built up is maintained for a lengthy time.

The moisture entrained with the overflowing container atmosphere, just like the water of condensation produced by the cooling system, is taken up via the intake device and the air compressor into the compressed air which is generated and when the compressed air becomes oversaturated it is removed in the water separator.

The invented process occurs in a circuit, with the container atmosphere displaced from the storage or transport container by introduction of the nitrogen flow being returned to the process and only the air vented to the surroundings as permeate from the gas separation membrane being replaced by air sucked in from the surroundings. In this way, the moisture contained in the displaced container atmosphere can be reused for the moistening and also the water condensed out from the container atmosphere by the cooling system can be returned to the process.

The air now being compressed has a slightly increased fraction of nitrogen. but this has only slight effect on the buildup time of the nitrogen atmosphere. The fractions of carbon dioxide or ethylene present in the container atmosphere are not a problem in the method of the invention. The gas separation membrane separates these gases and vents them outside into the surrounding air.

The moisture contained in the displaced container atmosphere is returned to the process by the closed circuit, via the compressor. Since the water of condensation removed by the cooling device is also taken to the compressor intake, the moisture can also be returned to the process. As a consequence, unlike the conventional systems, the moisture in the container can be maintained and the fruit prevented from drying out even under the most extreme environmental conditions. With the high, controlled moistening capability of the method of the invention, a high humidity can be maintained in the container atmosphere and thus the weight loss can be reduced to 0.5 to 1%.

Through the particular adjusting of the nitrogen flow, the buildup times are considerably shortened during the period of the nitrogen buildup in the storage or transport container, thanks to suitable adaptation of the volume flows. According to the invention, a cascade valve is preferably used to adjust the nitrogen flow. The proportional valves otherwise used are technically cumbersome and therefore maintenance-intensive. In order to ensure a stable operation, proportional valves have considerable requirements for the control software. On the other hand, cascade valves are more simple in construction, robust, and unlike a proportional valve they are nearly totally service-free. The cascade valve has a small footprint and is much more economical in price than a proportional valve. Using the regulating mechanism, one can produce the required nitrogen flow and adjust and maintain the necessary nitrogen content of the atmosphere.

With the help of the device and the method of the invention, it is possible to build up a nitrogen-rich atmosphere in a storage or transport container with a residual oxygen content of around 2 to 4%. For this, one will have to maintain a relative humidity of around 85-95%.

The gas separation membranes used according to the invention require no dehumidified/dry compressed air; the compressed air furnished to them need only be free of unbound/free water. Their separating ability is limited not only to the separation of oxygen, but moreover all gases contained in the supplied compressed air such as carbon dioxide, carbon monoxide, ethylene and noble gases are removed and taken away as permeate. Likewise, the water vapor contained in the compressed air is almost totally separated and taken away, so that the resulting nitrogen flow is almost absolutely dry.

The moistening membranes used according to the invention remove the water vapor present in the compressed air at the secondary side and add to it the nitrogen produced by the gas separation membrane on the primary side. The efficiency of the water vapor transfer depends, among other parameters, on the temperature of the compressed air, which determines the absorbency for water vapor (humidity). A high temperature of the compressed air is needed in order to absorb and transfer a large amount of humidity. The transfer efficiency of the moistening membranes used is around 85% in the case of dry nitrogen.

In the method of the invention, contrary to conventional methods, it is also possible to use the water of condensation of the cooling device. Any germs will be killed by the compression temperature inside the compressor; any dirt will be removed from the compressed air in the filters downstream from the compressor.

Furthermore, the water is transferred in the form of water vapor through the membrane walls to the nitrogen and is therefore "chemically pure".

The high temperature of the compressed air, preferably 50° C. to 60° C., increases the efficiency of the gas separation membrane. With rising temperature of the compressed air supplied, the ratio of residue and permeate shifts in favor of the residue. The result is a greater nitrogen flow for the same residual oxygen or the same nitrogen flow for less residual oxygen. In this way, one can basically increase the speed of the nitrogen buildup in the transport container, with the result that the fruit falls more quickly into the "artificial coma", which in turn means an improved transport outcome.

Starting Phase (Type II)

When warehoused fruits contain a lot of moisture in their peel, such as pineapple that was harvested and packed immediately after a rain shower, free water is formed in the container over a lengthy period of storage or transport, despite the formation of condensate by the cooling device and the expulsion of humid container atmosphere, and this evaporates into the container atmosphere. The relative humidity in the container will therefore not fall below 100%. In order to protect the goods from rotting and the cardboard from becoming wet, the storage or transport container must be dehumidified in this case.

The invented method after running through the starting phase type I is then switched to the starting phase type II. In this method of operation, all of the air sucked in by the air compressor is taken from the storage or transport container and compressed by the air compressor. Also, the very large quantity of water condensed at this humidity from the cooling device is taken to the compressor. The temperature of the air taken in is raised by the heat of compression, the humidity taken from the storage or transport container is absorbed as water vapor by the compressed air and entrained as free water.

The compressed air produced is taken entirely through the cooling device, which cools it to a temperature just above the temperature inside the storage or transport container. The cooled compressed air is carried to the water separator and then to the air filter. Due to the intense cooling of the compressed air, its ability to absorb water vapor is correspondingly heavily reduced, and a lot of free water is formed, which is removed in the water separator along with the free water which is already present.

The compressed air, now free of water of condensation, is taken via an expansion valve directly back to the storage or transport container. The compressed air returned to the container has lost more than 80% of the humidity it originally contained, as compared to the removed atmosphere. In the storage or transport container, the atmosphere brought in replaces the container atmosphere sucked away by the compressor. The process is run in a closed circuit.

So as not to jeopardize the air conditioned atmosphere in its nitrogen content, starting phase type II is preferably run only in cycles. After each cycle of starting phase type II, the container atmosphere is checked for its humidity and oxygen content and then switched to normal stationary duty. Only if a relative humidity of 100% persists for a lengthy period of time is another cycle of starting phase II triggered to dehumidify the container air, In earlier methods, it is assumed that a sufficient dehumidification is achieved by supplying of dry nitrogen and the associated displacement of atmosphere from the transport container. But observations of corresponding transports have shown that it is not possible to dry the atmosphere in the transport container during the transport period by bringing in dry nitrogen and adjusting a humidity of less than 100% when large amounts of free water are present.

The device of the invention makes possible an effective dehumidification. Not only can the displaced atmosphere be taken to the compressor, but also it is possible to obtain the entire intake air for the compressor from the container. Under these conditions, a large portion of free water is created in the compressed air, which is taken away via the separator device.

Once the transport or storage is at an end and the container is opened and unloaded, it is necessary to return the air conditioned atmosphere to normal ambient conditions. A nitrogen atmosphere with less than 15% oxygen, especially the residual oxygen values of 2-4% which are typical of an air conditioned atmosphere, represents a lethal danger to the people involved in handling these storage or transport containers. By removal of the entire intake air from the surroundings, direct return to the container bypassing the gas separation and moistening membranes, and venting of the displaced atmosphere to the surroundings, the nitrogen level in the invented device is lowered in the shortest of times and risk to the unloading personnel is avoided.

In the shutoff phase, only air is taken in by the air compressor from the surroundings and compressed. The displaced container atmosphere is diverted entirely to the surroundings. The cooled compressed air is taken on to the water separator and then to the air filter. The now cleaned compressed air is decompressed across an expansion valve and then returned to the storage or transport container. In the storage or transport container, the ambient air brought in displaces the container atmosphere and takes it out into the surroundings. This atmosphere mixes in the shortest time with the free ambient air and represents no hazard at all. After reaching a residual oxygen value of 15% or more, the unit switches off, and the container can be opened without risk.

The invention shall now be explained more closely by means of figures, without the invention being limited to these embodiments.

Figure 4A:
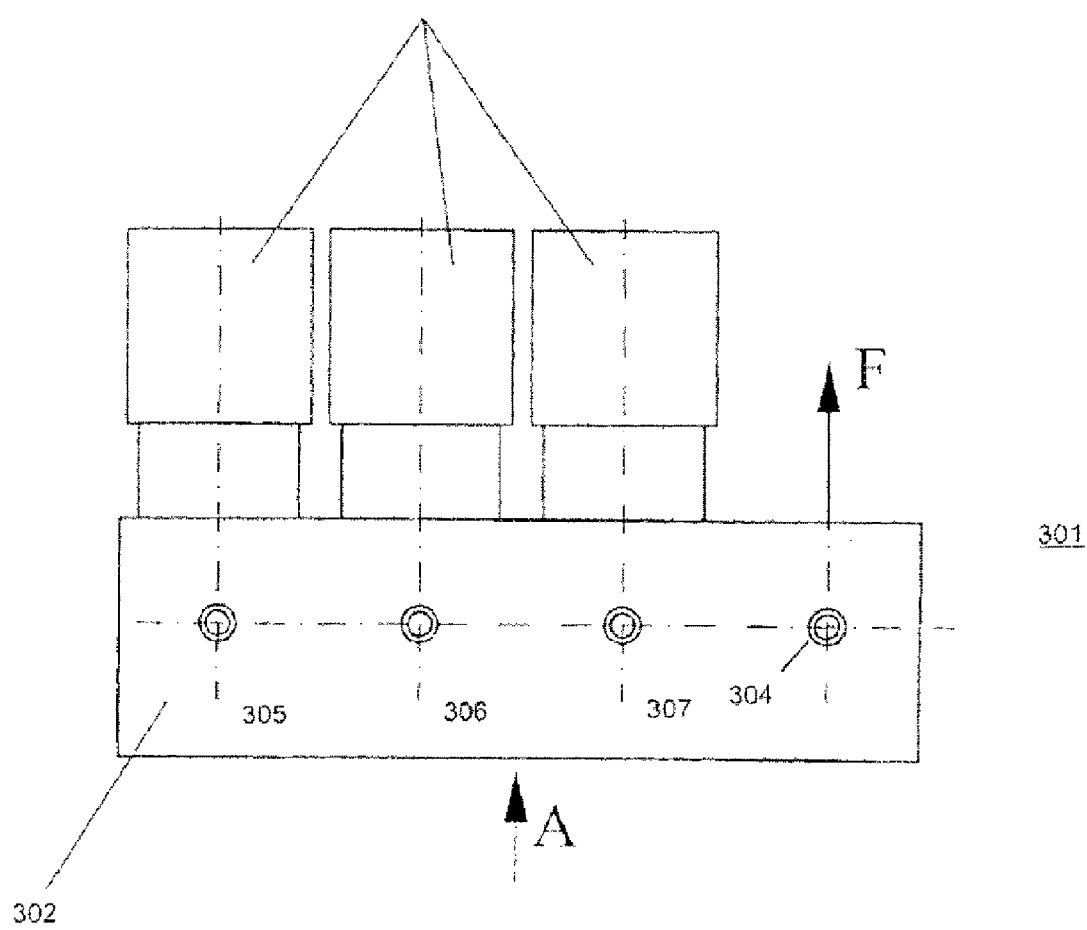

FIG. 4a+b shows a section through various cascade valves.

Figure 5:
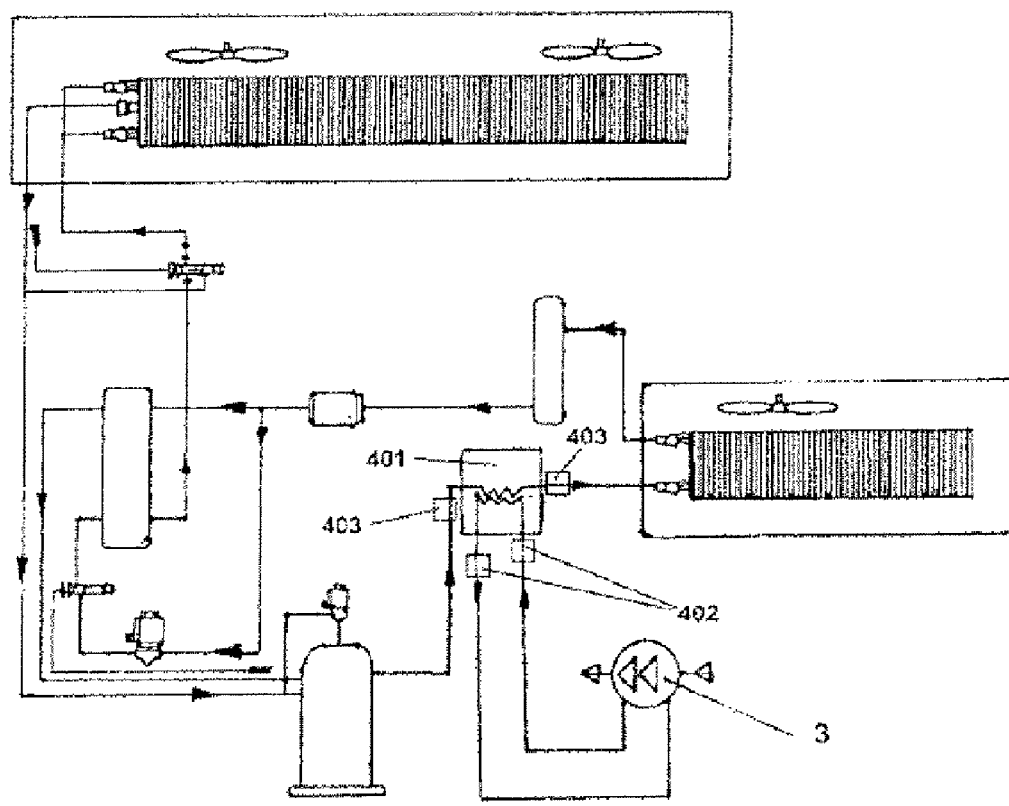

FIG. 5 shows an embodiment of the oil cooler as a plate heat exchanger.

Figure 1:
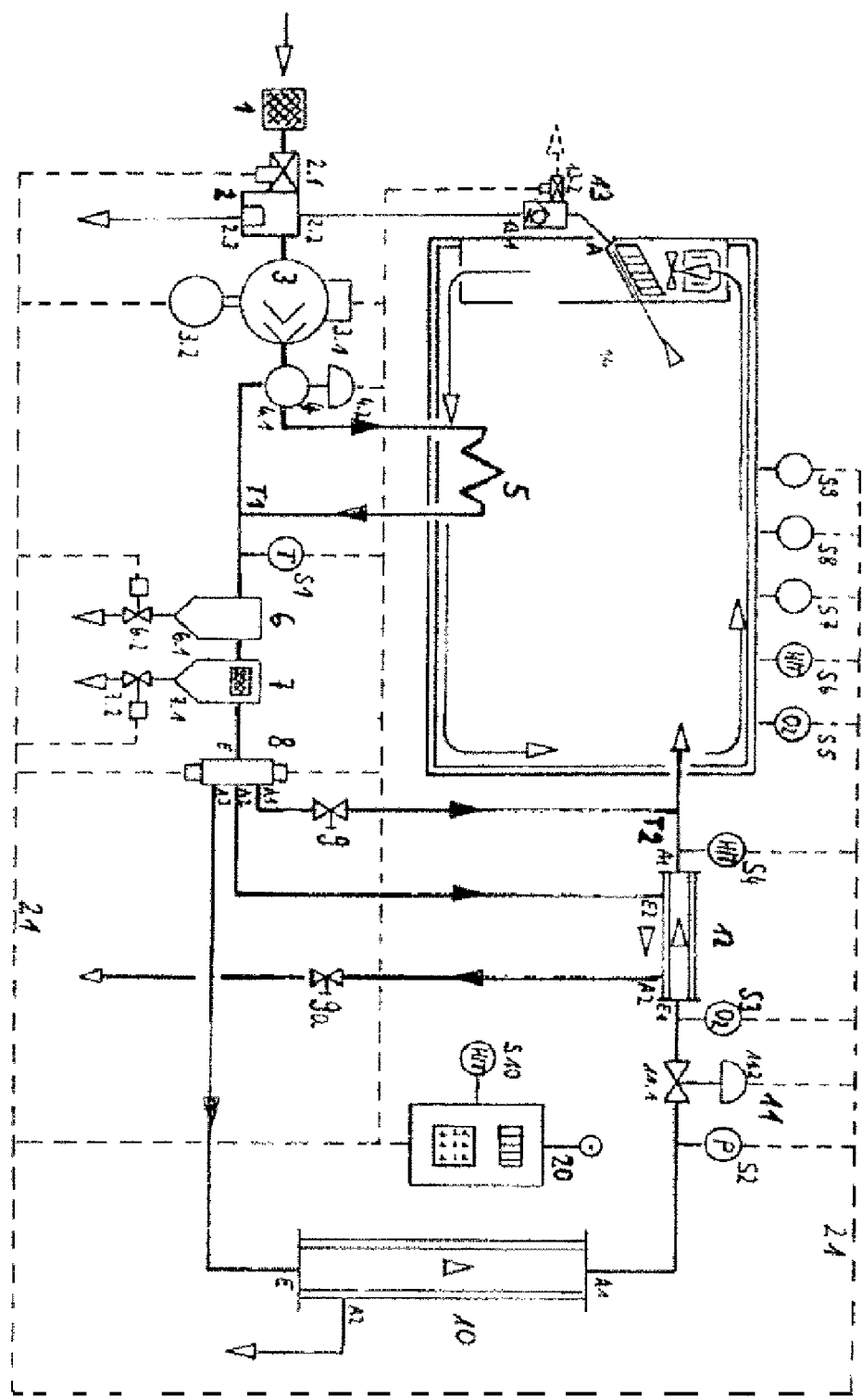
FIG. 1 shows a schematic diagram of the invented device, or a device to carry out the method of the invention.

As can be seen in FIG. 1, air from the surroundings is sucked in through an intake filter (1) by means of an intake device (2). The use of the intake filter (1) protects the intake device against dirt present in the ambient air. If necessary, heating is done to prevent frost formation at low outdoor temperatures.

The use of an intake device (2) after the intake filter (1) makes it possible for the following air compressor (3) to take in ambient air and displaced container atmosphere and to mix in water condensed out from the container atmosphere and vented by the cooling device in the intake flow of air obtained from the surroundings. Collecting water, which cannot be added to the intake air because the humidity of the ambient air is too high, is vented to the surroundings. The entire intake air of the compressor can be taken from the container, in order to dehumidify the container atmosphere.

The intake valve (2.1) is open in the ground setting and closed for dehumidifier duty. Furthermore, the intake device (2) has an air return fitting (2.2), by which the atmosphere displaced from the container is returned to the air compressor. The water of condensation of the cooling machine is also diverted by the air return fitting (2.2) to the intake air stream and taken to the compressor. The intake device (2), furthermore, has an automatic drainage valve (2.3), which automatically opens when there is a lot of water of condensation present at the start of the cooling process and drains the intake device (2). In pure cooling duty (without operation of the air conditioning system at the same time), the drainage valve (2.3) vents the collecting water of condensation to the surroundings.

After the intake device (2) comes the air compressor (3), which produces the compressed air needed for the process and takes it to the following mixing valve (4). The temperature of the compressed air produced is raised considerably in this process by the heat of compression. The air compressor (3) can has a control mechanism (3.1), by means of which the operating states of the compressor (3) are monitored and controlled. The air compressor (3) is connected to a drive unit (3.2), which is preferably electrically powered.

A mixing valve (4) after the air compressor takes the resulting compressed air in partial streams directly or across a cooling device (5) inside the storage or transport container to the mixing point (T1) further downstream. This has a valve body (4.1) and a servo-drive (4.2). The warm compressed air is taken to the entrance (E) of the mixing valve and taken as a partial stream via the outlet (A1) to the cooling device (5). Another partial stream is taken, uncooled, via the outlet (A2) of the mixing valve. The partial streams merge at point (T1) of the compressed air lines and form there a mixed temperature, whose value is detected by the temperature measurement (S1) downstream from the point (T1). By actuating the mixing valve (4), an appropriate division of the partial streams is produced and thus a mixed temperature is produced at the point (T1).

The partial streams are preferably divided so that a compressed air temperature is adjusted at point (T1) which on the one hand enables the uptake of water vapor necessary for the transfer of humidity and on the other hand allows for the temperature stability of the following components. Depending on the operating situation and temperature of the compressed air at the outlet of the air compressor (3), either of the two partial streams can amount to 0% to 100%.

One outlet of the mixing valve (4) is connected to the cooling device (5). This is arranged in the interior of the storage and/or transport container. The cooled compressed air is taken to the mixing point (T1). The second outlet of the mixing valve (4) is connected to the mixing point (T1) with the temperature measurement (S1). The uncooled compressed air is taken to the mixing point (T1) and mixed there with the cooled compressed air coming from the cooling device (5). The mix temperature of the compressed air is detected by the temperature measurement (S1).

From the mixing point (T1), the compressed air flows through a water separator (6), where the condensed (free) water fractions are separated. The water separator (6) has a separator housing (6.1) and a drainage device. The separated water is collected in the lower region of the housing (6.1) and drained off to the surroundings in suitable manner.

The dewatered compressed air arriving from the water separator (6) is filtered to the desired purity in a filter device (7) and taken to the 3-way valve (8). The filter device (7) has a separator housing (7.1) and a drainage device. The water condensed during the filtering is collected in the lower region of the housing (7.1) and drained off to the surroundings in suitable manner. But the filter device (7) can also have several filters, which are accommodated either in separate or in a common housing. A common housing for water separator (6) and filter device (7) is also possible.

The compressed air leaving the filter device (7) is taken to a 3-way valve (8). Depending on the operating situation, the compressed air flows through outlet (A1), (A2) or (A3). In humidifier duty, the compressed air is taken from the outlet (A2) of the 3-way valve to the moistening membrane (12) and provides the necessary moisture for the nitrogen produced by the gas separation membrane (10), before the now dehumidified compressed air is decompressed at the trim valve (9a) and vented to the surroundings. At the same time, compressed air is taken from outlet (A3) to the gas separation membrane (10). In starting phase type II, a connection to the storage or transport container is made from outlet (A1) via the trim valve (9), in order to return to the container the atmosphere that was removed from it after the dehumidification at the water separator (6). In starting phase type I, the compressed air is taken from outlet (A3) of the 3-way valve directly to the gas separation membrane (10) via the point (T2), with no partial stream flowing through the moistening membrane (12) and providing moisture.

The compressed air leaving the outlet (A3) of the 3-way valve is taken to the gas separation membrane (10). As it flows through the gas separation membrane (10), an oxygen-rich gas mixture and other gases contained in the compressed air such as water vapor, carbon dioxide or ethylene is totally separated from the compressed air and taken away as permeate via the outlet (A2) to the surroundings. The remaining smaller nitrogen-rich gas flow (residue) is taken away via the outlet (A1) of the gas separation membrane (10) and taken across the pressure measurement (S2) to the nitrogen valve (11). The separation of the oxygen occurs in dependence on the system pressure set by the nitrogen regulating valve (11). The valve consists of a valve body (11.1) and the servo-drive (11.2). The control variable used to adjust the system pressure is the oxygen measurement (S3) downstream from the nitrogen regulating valve (11). Alternatively, the pressure measurement (S2) can also serve as the control variable for the nitrogen regulating valve (11).

From the nitrogen regulating valve (11), the nitrogen stream is taken to the moistening membrane (12) and after flowing through the membrane body it is taken to the storage or transport container (14), mixed there with the container atmosphere, and increases the fraction of nitrogen or decreases the fraction of oxygen. If compressed air also flows through the moistening membrane (12) at the secondary side from the 3-way valve (8), the moisture contained in the compressed air will be transferred to the nitrogen stream, with the consequence that the warehouse or transport container (14) receives a "wetter" nitrogen stream. The water content of the nitrogen stream is detected at a humidity/temperature measurement (S4). By comparing with the humidity measurement of the storage or transport container (S6) and evaluating the comparison values, the required compressed air temperature and thus the required humidity input is adjusted, so that the desired quantity of humidity is supplied to the transport container.

The container atmosphere is monitored by an oxygen measurement (S5) and a humidity/temperature measurement (S6). The pressure maintaining device (13) contains a pressure holding valve (13.1) and an expansion valve (13.2). Upon reaching the required internal pressure of the storage or transport container (14), the pressure holding valve (13) opens and conveys the overflowing container atmosphere to the air return fitting (2.2) of the intake device (2) including the content of water vapor back to the process. The expansion valve is opened to release the nitrogen atmosphere of the container, in order to vent the displaced atmosphere to the surroundings.

By means of a control mechanism (20) the operating parameters are entered and the operating states indicated. It contains test and operations programs and displays all conditions of the system. Through the control mechanism (20), sensors are evaluated and actuators are activated.

Figure 2:
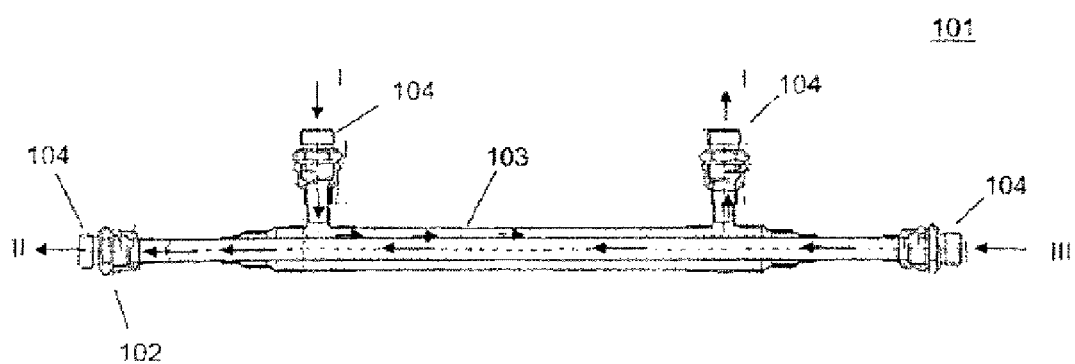
FIG. 2 shows a sample embodiment of a heat exchanger arranged in the device, in longitudinal section.

FIG. 2 shows a heat exchanger, such as can be used to heat the compressed air before entering the gas separation membrane (10). The heat exchanger (101) is made from a double tube. The inner tube (102) receives the flow of compressed air, which is taken to the gas separation membrane (10) after leaving the compressed air treatment (4, 5, 6, 7) (compressed air III). The outer tube (103) receives the flow of compressed air arriving from the air compressor (3) and taken to the cooling device (5) (compressed air I). Since the temperature of compressed air I is much higher than the temperature of compressed air III, a portion of the energy is transferred from compressed air I to compressed air III, so that the temperature of compressed air I drops and the temperature of compressed air III rises. Thanks to the rise in temperature of compressed air III, the free water droplets evaporate at least partly and thus the moisture content of the air can be adjusted. Optimally, under ideal operation of the heat exchanger, a relative humidity of 80-85% will be adjusted in the compressed air through the temperature rise. The heat exchanger is fastened by the connection screws (104) to the corresponding pipe or hose lines or components of the invented device. In another embodiment, not shown, the heat exchanger (101) is designed so that the compressed air I surrenders energy not only to the compressed air III, but also thanks to partial or total lack of insulation on the outer tube (103) energy is also surrendered to the circulating air of the container cooling system. The energy given up to the circulating air can be further intensified by enlarging the surface, for example, by using a finned pipe. This embodiment of the heat exchanger results in a precooling of the compressed air I, so that the air cooler of the cooling device can be smaller in design. Preferably, the heat exchanger is arranged between the 3-way valve (8) and the gas separation membrane (10). while the outlet of compressed air III should be situated as near as possible to the inlet of the gas separation membrane. In this way, the temperature loss after flowing through the heat exchanger is reduced.

Figure 3A:
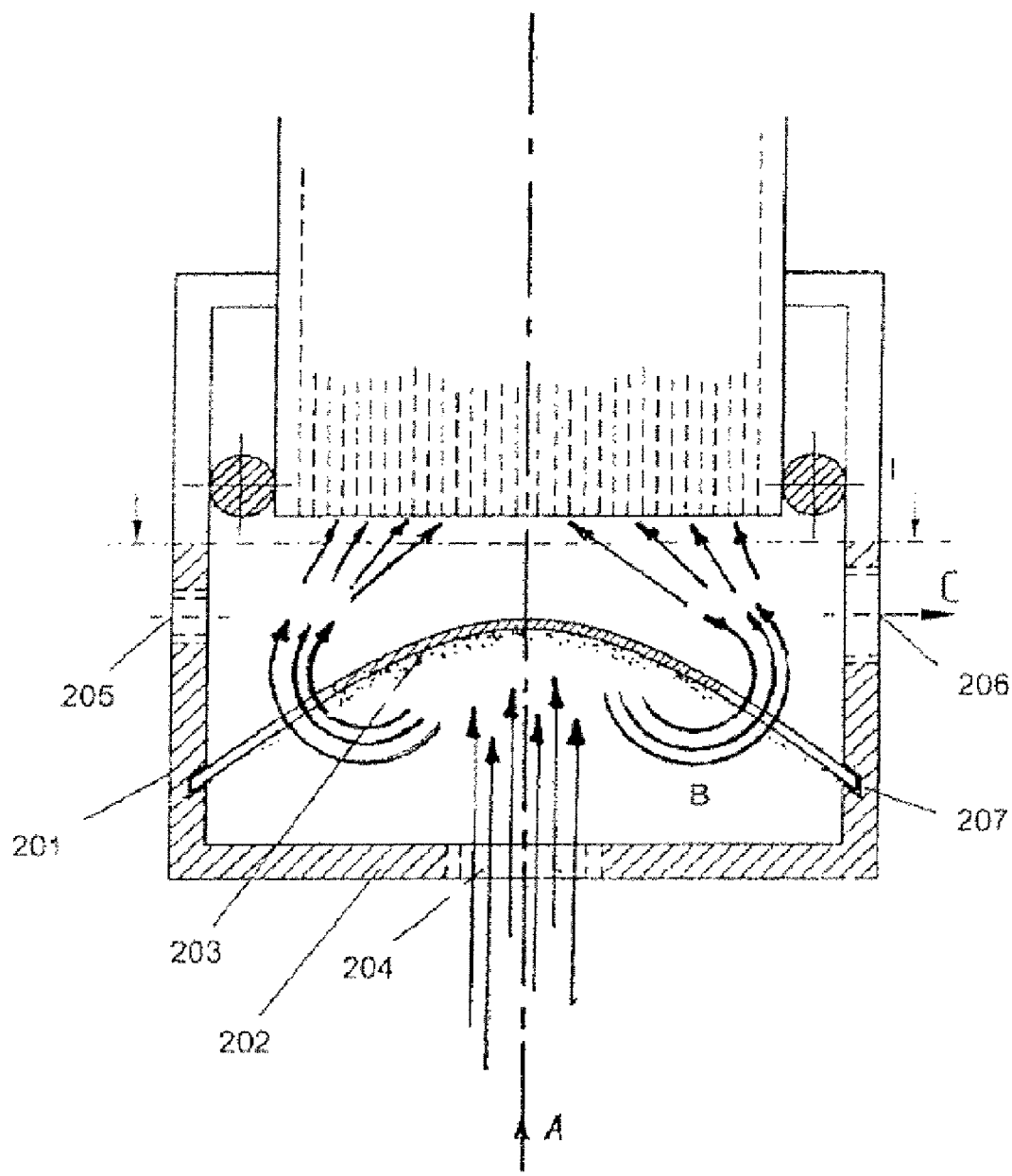
FIG. 3a shows a longitudinal section through a water trap and FIG. 3b a transverse section.

FIG. 3a shows a cross section of the component in which the gas separation membrane (10) is arranged. In this embodiment, a water trap (201) is placed before the gas separation membrane (10). The water trap is made of two pieces, a functional bottom (202) and a baffle (203). The functional bottom has a threaded bore (204) at the center, by which compressed air A is supplied to the gas separation membrane (10). Furthermore, threaded bores are arranged in the functional bottom to accommodate sensors, such as pressure sensors or temperature sensors. In the side wall of the functional bottom there is a further threaded bore (206), by which compressed air is taken to the moistening membrane (12). The functional bottom is made preferably of aluminum and is mounted on a conventional gas separation membrane in place of the usual entry of the flange. Inside the functional bottom is a device for fastening the baffle (203). In the depicted embodiment, the functional bottom (202) is provided with a circumferential groove (207) on the inside, in which the baffle (203) is installed. The baffle is slightly oversized, so that it stays in its position solely thanks to the bending stress. It is shaped so that it forms a spherical cap, whose highest point is near the center of the stack of membranes. The baffle is preferably made of coated refined steel. Thanks to the effect of the coating, large water drops are formed, which run down the baffle and drip off the edge of the plate. The compressed air A is taken through the threaded bore (204) into the functional bottom (202). When the compressed air at the start of the process is carrying free water droplets, it flows against the baffle and is deflected B. At the deflection B. the flow velocity of the compressed air is reduced so much that free water droplets can no longer be fully carried along. These droplets settle on the baffle and run to the outer edge of the plate, thanks to the spherical shape. From there, they drip onto the functional bottom.

The flow of compressed air after the deflection at the baffle goes from the center of the sphere to the outer edge of the functional bottom B. The flow velocity here is further reduced, so that the separated water is not taken up again, but instead additional water droplets fall out.

After the device of the invention has taken on its operating temperature, a relative humidity of around 80% is established in the compressed air B supplied to the gas separation membrane (10). At this time, the moistening membrane (12) is released, so that compressed air (C) flows across the threaded bore (206) to the moistening membrane (12). The now dry compressed air entering through the threaded bore (204) is able to take up water from the functional bottom (202). It is advantageous that all deposited water be evaporated and taken up by the compressed air in the course of the process.

The embodiment using a water trap has the benefit that the gas separation membrane is reliably protected against free water droplets and this safeguards and preserves the function of the gas separation membrane, its efficiency and its lifetime.

Figure 3B:
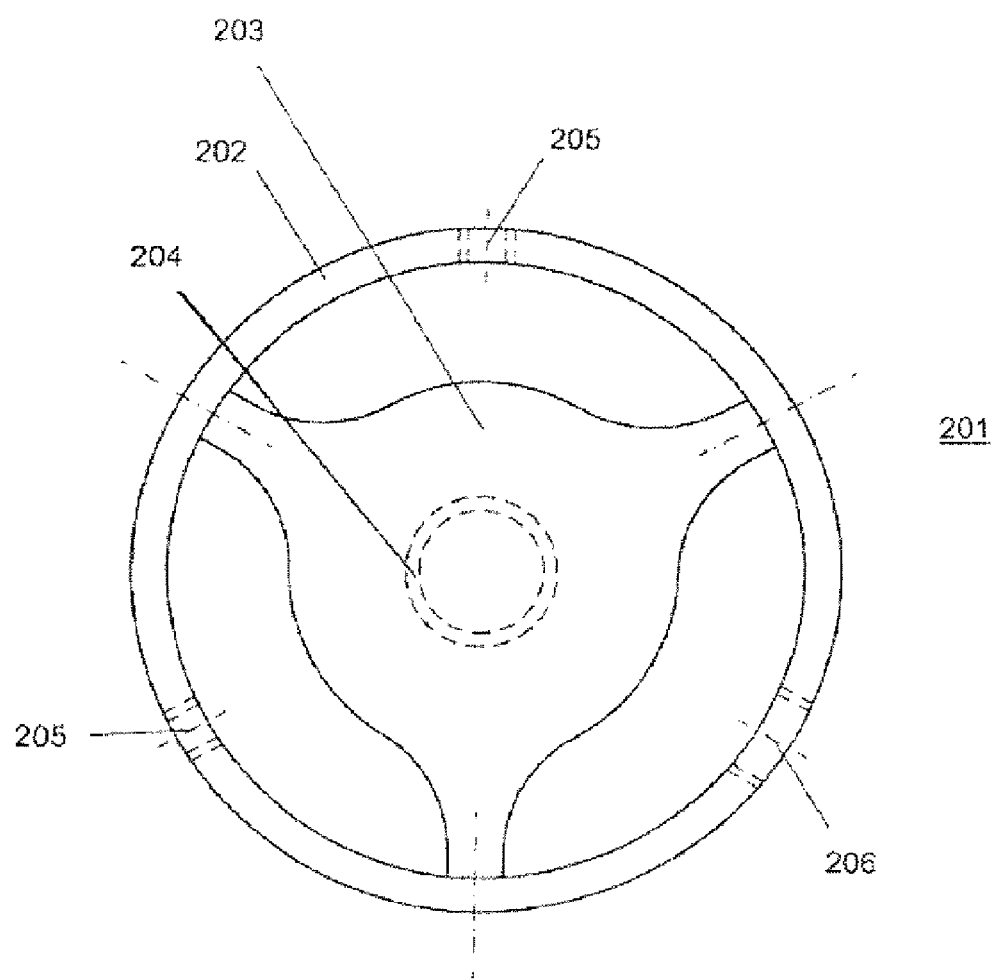

FIG. 3b shows a cross section through the water trap (201). In the circular functional bottom (202) there is arranged a basically circular baffle (203), being joined to the functional bottom by three braces arranged in a triangle. The threaded bores (205, 206) are arranged on the circular plane of the functional bottom (202), set off by 120° from each other. The baffle (203) is arranged centrally above the threaded bore (204) of the functional bottom (202), through which enters the compressed air being dewatered.

FIG. 4a shows an embodiment of the cascade valve (301), which can be used as the nitrogen valve (11). The cascade valve is made up of a valve body (302) with an internal system of bores and four internal trim devices. Three flange valves (303) are mounted on the valve body, being preferably electrically actuated.

The valve body (302) of the cascade valve contains the nitrogen feed line A, the partitioning of the nitrogen flow to the feed lines of the individual flange valves, and the adjusting device (304). It also contains the nitrogen feed lines to the adjustment mechanisms (305, 306, 307) connected in series with the respective flange valves, as well as the nitrogen feed lines to the nitrogen collector, connected after the adjustment mechanisms. The nitrogen collector is connected to the nitrogen outlet F.

The internal lines are preferably designed as bores, which are attuned to the connection channels for the flange valves and the trim devices so that no turbulence is produced in the internal lines.

The valve body (302) is connected by its fitting A directly to the outlet of the gas separation membrane. Thanks to the appropriate setting of the adjustment mechanism (304), the basic nitrogen flow is adjusted, forming the lowest value in terms of the residual oxygen content. The adjustment mechanisms (305, 306, 307) are adjusted for each respective activated flange valve so that a higher oxygen content results in the nitrogen flow. Thus, not only is it possible to increase the nitrogen content by switching on the respective valve for the nitrogen flow, but further increases in the residual oxygen/nitrogen flow are possible by combining the valves. The respective nitrogen flow produced is taken as a whole to the container via the outlet F.

Figure 4B:
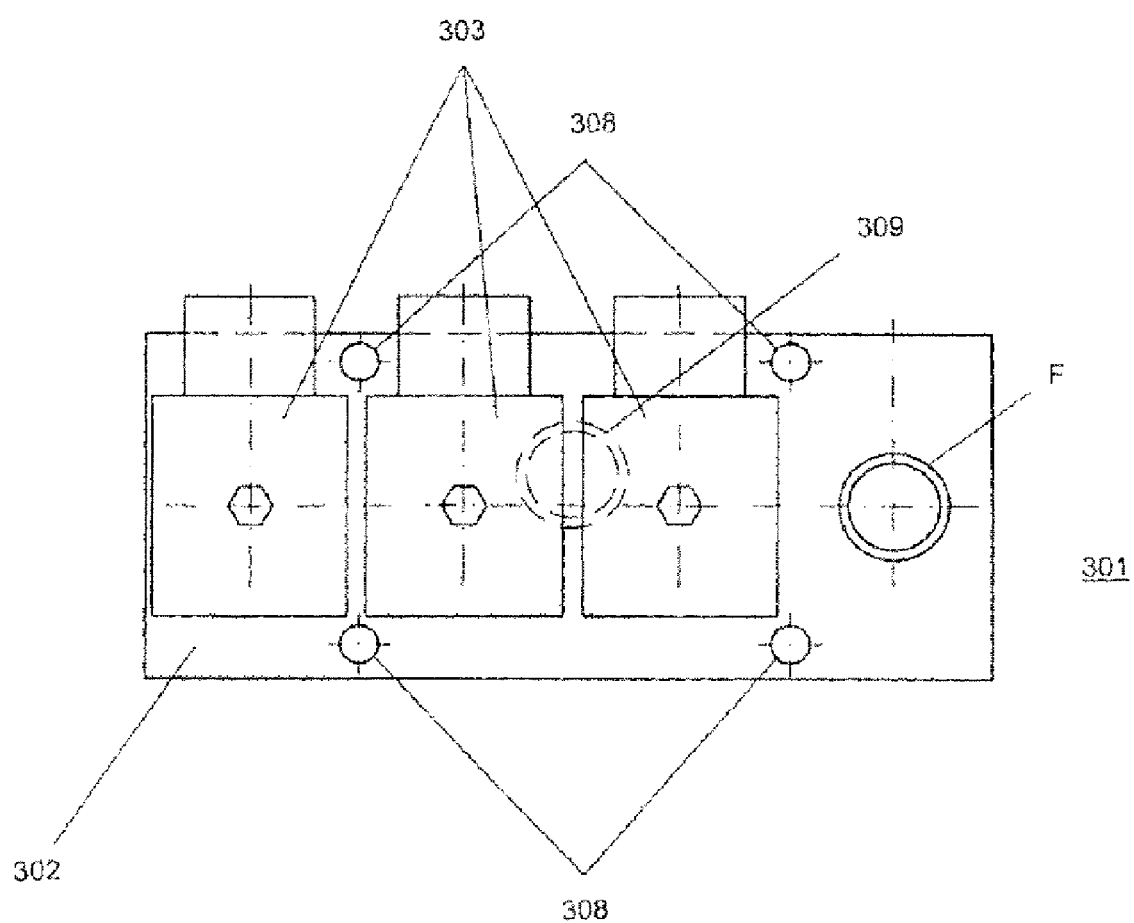

FIG. 4b shows another embodiment of the cascade valve (201). By means of the connector (308), the valve body (302) is connected directly to the gas separation membrane (10) (not depicted). The connection to the outlet opening of the gas separation membrane (10) is sealed by the O-ring (309). In this embodiment, the influence of impacts and vibrations on the connection is minimized. This ensures greater safety for the long-lasting quality of the pressurized connection of the cascade valve to the gas separation membrane.

FIG. 5 shows a possible embodiment of the oil cooler as an oil/refrigerant heat exchanger in the form of a plate heat exchanger (401). The input side (402) of the plate heat exchanger (401) is directly connected to the oil outlet and oil inlet fittings of the compressor (3). The compressor oil flows with a pressure produced by the air compressor (3) from the air compressor through the plate heat exchanger (401) and back to the compressor. The output side (403) of the plate heat exchanger (401) is connected to the cooling circuit of the cooling system. During operation of the device of the inventions the internal temperature of the container is maintained at +8 to +10° C., as that a sufficient cooling efficiency is available to take up the energy from the compressor oil and carry it away again via the condenser of the cooling device (5).

LIST OF REFERENCE SYMBOLS 1 intake filter
2 intake device
3 air compressor
4 mixing valve
5 cooling device
6 water separator
7 filter device
8 3-way valve
9 trim valve
9a trim valve for decompression
10 gas separating membrane
11 nitrogen valve
12 moistening membrane
13 pressure maintaining device
14 storage or transport container
S1 temperature measurement
S2 pressure measurement
S3 oxygen measurement
S4 temperature/humidity measurement
S5 oxygen measurement
S6 temperature/humidity measurement
S10 temperature/humidity measurement
20 controls
21 control and sensor lines
101 heat exchanger
102 inner tube
103 outer tube
104 connection screw
201 water trap
202 functional bottom
203 baffle
204 threaded bore
205 threaded bore
206 threaded bore
207 groove
301 cascade valve
302 valve body
303 flange valve
304 adjusting device
305 adjusting device
306 adjusting device
307 adjusting device
308 connector
309 O-ring
401 plate heat exchanger
402 inlet side
403 outlet side

The invention claimed is:

1. A device for producing an air conditioned atmosphere in a transport container comprising a compressor for creation of compressed air, a cooling device for cooling down the compressed air, a gas separation membrane connected downstream from the compressor and the cooling device to produce a gas flow rich in nitrogen, wherein the gas flow emerging from the gas separation membrane is taken to the transport container in order to maintain a nitrogen-rich, air conditioned atmosphere in the container, a moistening membrane, which is arranged behind the gas separation membrane, wherein the nitrogen flow emerging from the gas separation membrane is led through the moistening membrane and laden with moisture by the moistening membrane.

2. The device of claim 1, wherein the cooling device is arranged entirely in the transport container.

3. The device of claim 2, wherein the cooling in the cooling device occurs by heat exchange with a current of cool air and the cooling device.

4. The device of claim 1, wherein the gas separation membrane has a multiway valve upstream from it to separate the flow of compressed air.

5. The device of claim 4, wherein the multiway valve divides the compressed air into two partial streams, a first one of which is taken to the gas separation membrane and a second one of which is taken to the moistening membrane at the same time.

6. The device of claim 1, wherein compressed air produced by the compressor flows through the moistening membrane in addition to the nitrogen flow at the secondary side and the humidity is removed from the compressed air in the moistening membrane (12) and passed on to the nitrogen flow.

7. The device of claim 1, further comprising a water separator between the cooling device and the gas separation membrane for removal of the water of condensation, or an air filter for cleaning the compressed air.

8. The device of claim 1, wherein at the outlet of the container there is arranged a pressure maintaining valve, which is connected via an intake device to the compressor, while the intake device can be switched so that the container atmosphere emerging from the pressure maintaining valve is taken to the compressor for production of the compressed air.

9. The device of claim 1, wherein a mixing valve is arranged between the compressor and the cooling device, which divides the compressed air flowing from the compressor into two partial streams, one partial stream being taken through the cooling device to a mixing point where it is again combined with the second partial stream to adjust a defined temperature.

10. The device of claim 1, wherein the gas separation membrane is followed by a nitrogen regulating valve.

11. The device of claim 4, further comprising an expansion valve arranged between the multiway valve and the transport container.

12. A method of producing an air conditioned atmosphere in a storage or transport container having an internal atmosphere and surrounding air, comprising:
producing compressed air with a compressor from the surrounding air or the internal atmosphere;
cooling the compressed air with a cooling device;
producing nitrogen-rich gas flow from the compressed air with a gas separation membrane;
moistening the nitrogen-rich gas flow;
conducting the nitrogen-rich gas flow into the container causing the internal atmosphere to overflow;
leading the overflowing container atmosphere through a circuit to the air compressor.

13. The method of claim 12, wherein a defined moisture content of the nitrogen-rich gas flow is adjusted by a moistening membrane.

14. The method of claim 12, wherein moisture for loading onto the moistening membrane is obtained from the compressed air.

15. The method of claims 12, wherein the moistening membrane follows the gas separation membrane.

16. The method of claims 12, wherein the cooling device is arranged inside the storage or transport container.

17. The device of claim 1, wherein a heat exchanger is arranged upstream from the gas separation membrane.

18. The device of claim 1, wherein a water trap is arranged upstream from the gas separation membrane.

19. The device of claim 18, wherein the water trap includes a functional bottom and a baffle, and the functional bottom has a circular cross section and is mounted on the gas separation membrane in place of an inlet flange.

20. The device of claim 10, wherein the nitrogen regulating valve is a cascade valve connected directly to the outlet opening of the gas separation membrane.

21. The device of claim 20, wherein the cascade valve has a valve body with internal bore system and internal trim devices and three flange valves.

22. The device of claim 1, wherein the cooling device is an oil/refrigerant heat exchanger.

* * * * *

UNITED STATES PATENT AND TRADEMARK OFFICE
CERTIFICATE OF CORRECTION

PATENT NO. : 8,122,738 B2  
APPLICATION NO. : 11/992360  
DATED : February 28, 2012  
INVENTOR(S) : Heinrich Saul Page 1 of 1

It is certified that error appears in the above-identified patent and that said Letters Patent is hereby corrected as shown below:

Column 4, line 50, delete the "." and insert a --,--  
Column 4, line 59, delete the "," after the second word *valve* and insert a --.--  
Column 9, line 1, delete the word "he" and insert the word --be--  
Column 13, line 20, delete the word "beat" and insert the word --heat--  
Column 16, line 1, claim 15, delete the word "claims" and insert the word --claim--  
Column 16, line 3, claim 16, delete the word "claims" and insert the word --claim--

Signed and Sealed this  
Fourteenth Day of May, 2013

Teresa Stanek Rea  
*Acting Director of the United States Patent and Trademark Office*